United States Patent
Park et al.

(10) Patent No.: US 9,168,916 B2
(45) Date of Patent: Oct. 27, 2015

(54) METHOD AND SYSTEM FOR CONTROLLING ACCELERATION TORQUE OF HYBRID VEHICLE

(75) Inventors: Tae Wook Park, Seoul (KR); Jeongeun Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 921 days.

(21) Appl. No.: 13/171,050

(22) Filed: Jun. 28, 2011

(65) Prior Publication Data

US 2012/0143416 A1 Jun. 7, 2012

(30) Foreign Application Priority Data

Dec. 2, 2010 (KR) .................. 10-2010-0122240

(51) Int. Cl.
*B60W 20/00* (2006.01)
*B60W 10/06* (2006.01)
*B60W 10/08* (2006.01)

(52) U.S. Cl.
CPC ............. *B60W 20/106* (2013.01); *B60W 10/06* (2013.01); *B60W 10/08* (2013.01); *B60W 20/10* (2013.01); *B60W 20/104* (2013.01); *B60W 2510/244* (2013.01); *B60W 2520/10* (2013.01); *B60W 2540/10* (2013.01); *B60W 2710/0688* (2013.01); *B60W 2710/088* (2013.01); *B60W 2710/105* (2013.01); *Y02T 10/6286* (2013.01); *Y02T 10/7258* (2013.01)

(58) Field of Classification Search
CPC ..... B60W 10/06; B60W 10/08; B60W 20/10; B60W 20/104; B60W 20/106; B60W 2710/088; Y02T 10/6286

USPC ................ 701/22; 180/65.265, 65.28, 65.285
See application file for complete search history.

(56) References Cited

U.S. PATENT DOCUMENTS

| | | | | |
|---|---|---|---|---|
| 4,335,429 A | * | 6/1982 | Kawakatsu | 903/903 |
| 6,110,066 A | * | 8/2000 | Nedungadi et al. | 903/910 |
| 6,341,584 B1 | * | 1/2002 | Itoyama et al. | 903/903 |
| 6,441,506 B2 | * | 8/2002 | Nakashima | 903/903 |

(Continued)

FOREIGN PATENT DOCUMENTS

| | | |
|---|---|---|
| JP | 2005-023886 A | 1/2005 |
| JP | 2005-083300 A | 3/2005 |

(Continued)

*Primary Examiner* — Tuan C. To
*Assistant Examiner* — Dale W Hilgendorf
(74) *Attorney, Agent, or Firm* — Mintz Levin Cohn Ferris Glovsky and Popeo, P.C.; Peter F. Corless; Carolina E. Silve (57) ABSTRACT

A method and a system for controlling acceleration torque of a hybrid vehicle that can give sufficient acceleration without imposing burden on a battery by changing a maximum torque of a vehicle according to environmental variables are disclosed. The method sets a creep torque as a minimum torque; calculates a maximum torque that can be output from an engine considering of engine environmental variables; calculates a maximum torque that can be output from a motor considering of motor environmental variables; calculating maximum torque of the vehicle by adding up the maximum torque that can be output from the engine and the maximum torque that can be output from the motor; and calculates acceleration torque by using a position of an accelerator pedal, the minimum torque, and the maximum torque of the vehicle.

5 Claims, 4 Drawing Sheets

(56) References Cited

U.S. PATENT DOCUMENTS

| | | | |
|---|---|---|---|
| 6,775,601 B2* | 8/2004 | MacBain | 701/22 |
| 6,861,820 B2* | 3/2005 | Gale et al. | 318/727 |
| 6,883,626 B2* | 4/2005 | Aoki et al. | 903/903 |
| 6,915,782 B2* | 7/2005 | Hanada et al. | 123/399 |
| 7,117,071 B2* | 10/2006 | Aoki et al. | 701/22 |
| 2003/0052650 A1* | 3/2003 | Gunji | 320/155 |
| 2009/0105043 A1* | 4/2009 | Muta et al. | 477/97 |
| 2012/0116627 A1* | 5/2012 | Bailey et al. | 701/22 |
| 2012/0123624 A1* | 5/2012 | Sato et al. | 701/22 |
| 2012/0143415 A1* | 6/2012 | Park | 701/22 |
| 2012/0158225 A1* | 6/2012 | Books et al. | 701/22 |
| 2012/0185119 A1* | 7/2012 | Abe et al. | 701/22 |
| 2013/0006456 A1* | 1/2013 | Thaduvayi et al. | 701/22 |
| 2013/0030625 A1* | 1/2013 | Park et al. | 701/22 |

FOREIGN PATENT DOCUMENTS

| | | |
|---|---|---|
| JP | 2005-278239 A | 10/2005 |
| JP | 2009-173235 A | 8/2009 |
| JP | 2010-000867 A | 1/2010 |
| JP | 2010-095067 A | 4/2010 |
| KR | 10-2009-0077727 A | 7/2009 |

* cited by examiner

METHOD AND SYSTEM FOR CONTROLLING ACCELERATION TORQUE OF HYBRID VEHICLE

CROSS-REFERENCE TO RELATED APPLICATION

This application claims priority to and the benefit of Korean Patent Application No. 10-2010-0122240 filed in the Korean Intellectual Property Office on Dec. 2, 2010, the entire contents of which are incorporated herein by reference.

BACKGROUND OF THE INVENTION (a) Field of the Invention

The present invention relates to a method and a system for controlling acceleration torque of a hybrid vehicle. More particularly, the present invention relates to a method and a system for controlling acceleration torque of a hybrid vehicle that can pbe sufficient acceleration without imposing burden on a battery by changing a maximum torque of a vehicle according to environmental variables.

(b) Description of the Related Art

Recently, electric vehicles or hybrid vehicles have been developed and have attracted attention because of their enhanced fuel economy capabilities. While the electric vehicle generates driving torque of the vehicle only by a motor, the hybrid vehicle generates driving torque for the vehicle by an engine and a motor.

Typically, hybrid vehicles run in various modes (e.g., electric vehicle mode, hybrid mode, engine mode, and so on) according to a driving condition thereof. While in the electric vehicle mode, the driving torque is generated only by the motor. While in the hybrid mode, the driving torque is generated by the motor and the engine. And while in the engine mode, the driving torque is generated only by the engine.

Because the motor and the engine are operated together in the hybrid mode, torque division is very important for enhancing fuel economy and achieving a sufficient acceleration. Generally, when an acceleration torque is determined, the acceleration torque is divided between the engine and the motor according to a predetermined ratio.

Figure 4:
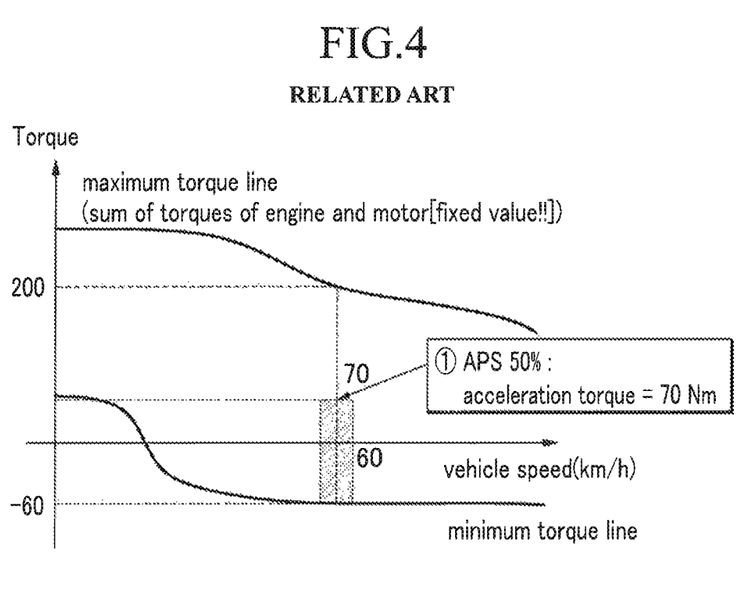
FIG. 4 is a graph illustrating a conventional method for calculating an acceleration torque.

For example FIG. 4 shows a conventional method for calculating the acceleration torque. FIG. 4 is a graph for explaining a conventional method for calculating an acceleration torque. As shown in FIG. 4, a minimum torque line and a maximum torque line are stored in a control portion. The minimum torque line is set by a creep torque according to a vehicle speed for achieving creep driving of a vehicle (driving at a D range without pushing an accelerator pedal). The maximum torque line is set by adding up a maximum torque of the engine and a maximum torque of the motor according to the vehicle speed. The minimum torque line and the maximum torque line do not change.

For instance, if the vehicle speed is 60 km/h, the maximum torque is 200 Nm and the minimum torque is −60 Nm. If a driver pushes the accelerator pedal and the position of the accelerator pedal is detected to be 50% at this state, the acceleration torque is calculated as follow.

$$\text{acceleration torque} = (\text{maximum torque} + \text{minimum torque}) * \text{position of accelerator pedal}$$
$$= (200 - 60) * 0.5 = 70 \text{ Nm}$$

However, the maximum torques over a driving period that can be output from the engine and the motor are changed according to environmental variables. According to a conventional method for calculating the acceleration torque, effects of the environmental variables are not considered for calculating the acceleration torque. For example, when the vehicle runs at the hilly or mountainous sections, the maximum torque that can be output from the engine may be 50% of the predetermined maximum torque of the engine. Therefore, when the acceleration torque calculated by the conventional method is divided between the engine and the motor, it is difficult to maintain state of charge (SOC) of a battery.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for controlling acceleration torque of a hybrid vehicle which efficiently managing SOC of a battery by considering effects of engine environmental variables and motor environmental variables on an acceleration torque of the vehicle.

A method for controlling acceleration torque of a hybrid vehicle according to an exemplary embodiment of the present invention may include: setting a creep torque (creep torque) as a minimum torque; calculating maximum torque that can be output from an engine considering of engine environmental variables; calculating maximum torque that can be output from a motor considering of motor environmental variables; calculating maximum torque of the vehicle by adding up the maximum torque that can be output from the engine and the maximum torque that can be output from the motor; and calculating acceleration torque by using a position of an accelerator pedal, the minimum torque, and the maximum torque of the vehicle.

In this embodiment, the engine environmental variables may include an altitude at which the vehicle is current driving, engine friction torque, and engine oil temperature. While at the same time, the motor environmental variables may include motor temperature and state of charge (SOC) of a battery.

A system for controlling acceleration torque of a hybrid vehicle according to another exemplary embodiment of the present invention may include: an accelerator pedal position detector configured to detect a position of an accelerator pedal; a vehicle speed detector configured to detect vehicle speed; an SOC detector configured to detect an SOC of a battery; an environmental variable detector configured to detect engine environmental variables and motor environmental variables; and a control portion configured to set a creep torque as a minimum torque, calculate a maximum torque of a vehicle according to the engine environmental variables and the motor environmental variables, and calculate an acceleration torque by using the position of the accelerator pedal, the minimum torque, and the maximum torque of the vehicle.

The control portion may calculate a maximum torque that can be output from an engine considering of the engine environmental variables, calculate a maximum torque that can be output from a motor considering of the motor environmental variables, and calculate the maximum torque of the vehicle by adding up the maximum torque that can be output from the engine and the maximum torque that can be output from the motor.

The engine environmental variables may include the altitude at which the vehicle is currently traveling, engine friction torque, and engine oil temperature. While at the same time, the motor environmental variables may include motor temperature and the SOC of a battery.

The control portion may further divide the calculated acceleration torque to the engine and the motor according to a ratio of the maximum torque that can be output from the engine to the maximum torque that can be output from the motor.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings.

The embodiment described in the present specification and the configuration shown in the drawings are merely an exemplary embodiment of the present invention and do not represent all of the technical spirit of the present invention. Thus, it should be understood that there may be various equivalents and modified examples that can replace the embodiments described in the present specification and the configuration shown in the drawings at the time of filling the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
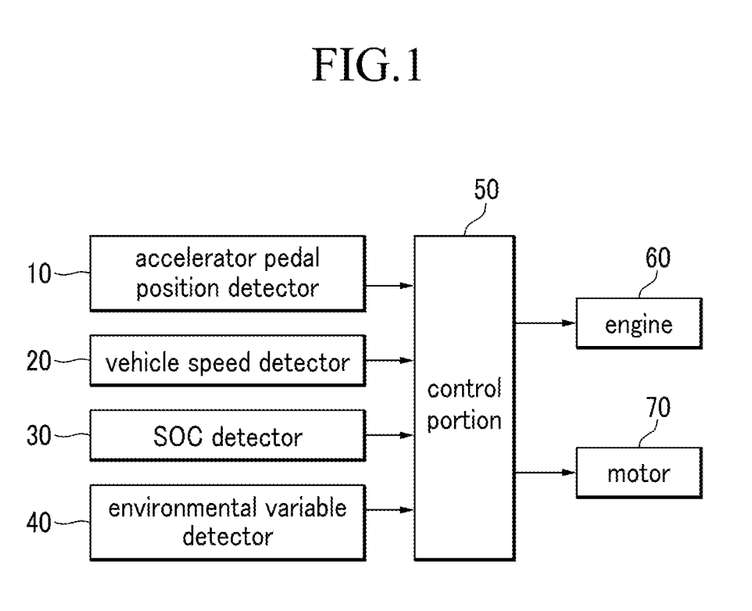
FIG. 1 is a block diagram of a system for controlling acceleration torque of a hybrid vehicle according to an exemplary embodiment of the present invention.

FIG. 1 is a block diagram of a system for controlling acceleration torque of a hybrid vehicle according to an exemplary embodiment of the present invention.

A hybrid vehicle to which an exemplary embodiment of the present invention is applied includes at least one engine 60 and at least one motor 70. In addition, the hybrid vehicle provides a hybrid mode at which the engine 60 and the motor 70 are simultaneously operated.

As shown in FIG. 1, a system for controlling acceleration torque of a hybrid vehicle according to an exemplary embodiment of the present invention includes an accelerator pedal position detector 10, a vehicle speed detector 20, a state of charge (SOC) detector 30, an environmental variable detector 40, and a control portion 50.

The accelerator pedal position detector 10 detects a position of an accelerator pedal (the amount/degree an accelerator pedal has been pushed) and delivers a signal corresponding thereto to the control portion 50, (e.g., a processor or controller). If the accelerator pedal is pushed completely the position of the accelerator pedal is 100%, and if the accelerator pedal is not pushed at all, the position of the accelerator pedal is 0%. Alternatively or in conjunction, a throttle valve opening sensor installed at an intake passage may be used instead of the accelerator pedal position detector 10 to determine the acceleration demand at an instantaneous period of time for a vehicle. Therefore, it is to be understood that the accelerator pedal position detector 10 can include the throttle valve opening sensor and the position of the accelerator pedal includes an opening of a throttle valve in this specification and claim set.

The vehicle speed detector 20 is installed on a wheel of the vehicle, detects a vehicle speed, and delivers a signal corresponding thereto to the control portion 50.

The SOC detector 30 detects SOC of a battery and delivers a signal corresponding thereto to the control portion 50. Instead of directly detecting the SOC of the battery, current and voltage of the battery may be detected and the SOC of the battery may be estimated based thereon.

The environmental variable detector 40 detects engine environmental variables and motor environmental variables, and delivers a signal corresponding thereto to the control portion 50. The engine environmental variables may include the altitude that the vehicle is currently driving, a friction torque of the engine 60, and a temperature of engine oil.

The altitude that the vehicle is currently driving is related to amount and density of air flowing into the engine during one cycle and an ambient temperature. Accordingly, engine output is changed according to the amount and the density of the air flowing into the engine during one cycle and is well-known to a person of an ordinary skill in the art. In addition, the friction torque of the engine 60 is changed according to the output torque of the engine 60, the ambient temperature, the coolant temperature, and engine oil temperature, and is stored in a predetermined map. The engine oil temperature is related to the ambient temperature. Therefore, the ambient temperature may be used instead of the engine oil temperature.

The motor environmental variables may include a temperature of the motor 70 and the SOC of the battery. An output of the motor 70 is related to current applied to the motor 70 and mechanical friction. The current applied to the motor 70 can be calculated from the SOC of the battery, and the mechanical friction can be calculated from the SOC of the battery and the temperature of the motor 70.

A maximum torque that can be output from the engine 60, a maximum torque that can be output from the motor 70, and creep torque (sum of an engine torque and a motor torque)

enabling of creep driving of the vehicle are stored in the control portion 50. Since the creep torque is the smallest amount of torque that will ever be demanded from the vehicle, the control portion 50 sets the creep torque as a minimum torque.

In addition, the control portion 50 receives the signals from the detectors 10, 20, 30, and 40, and calculates the maximum torque that can be output from the engine 60 at a current running state and the maximum torque that can be output from the motor 70 at the current running state. The control portion 50 calculates a maximum torque of the vehicle by adding up the maximum torque that can be output from the engine 60 and the maximum torque that can be output from the motor 70.

In addition, the control portion 50 calculates an acceleration torque by using the position of the accelerator pedal, the minimum torque, and the maximum torque of the vehicle, and calculates an engine division torque and a motor division torque which the engine 70 and the motor 60 should respectively output. Accordingly, the engine 60 and the motor 70 are operated according to the engine division torque and the motor division torque calculated by the control portion 50.

Figure 2:
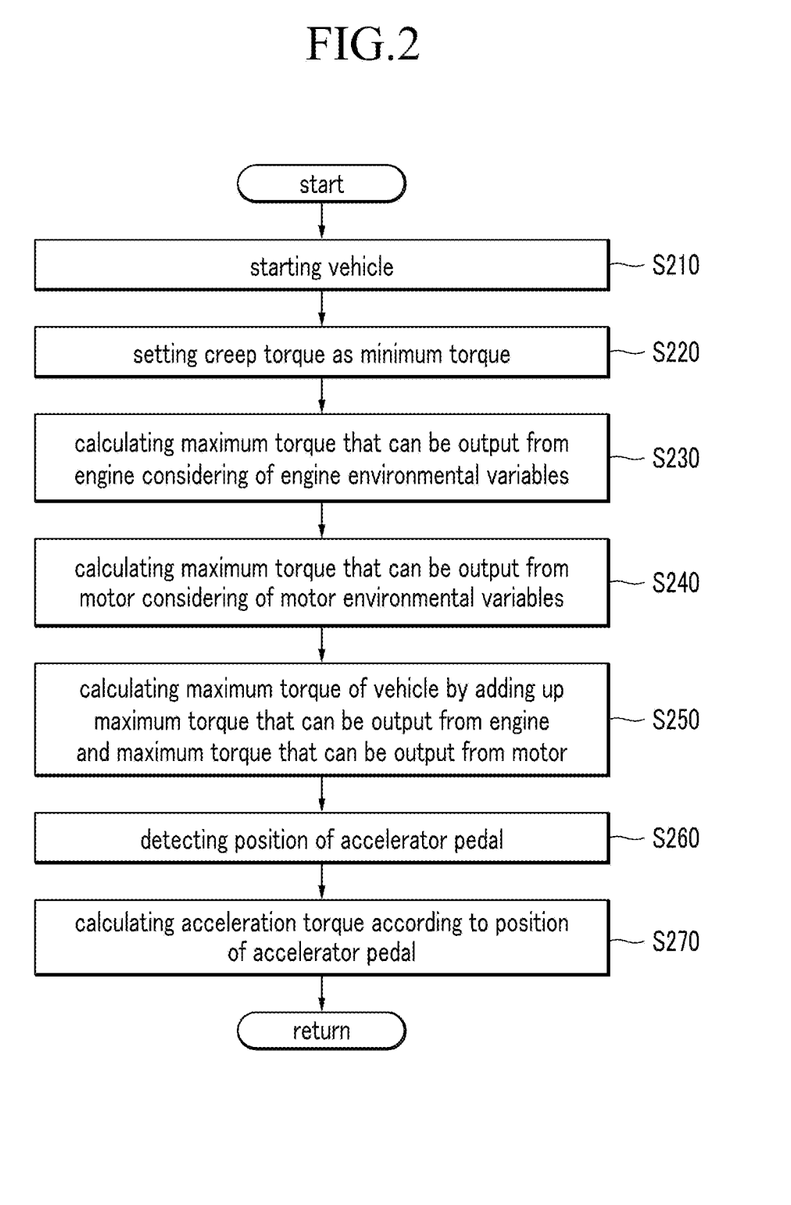
FIG. 2 is a flowchart of a method for controlling acceleration torque of a hybrid vehicle according to an exemplary embodiment of the present invention.

FIG. 2 is a flowchart of a method for controlling acceleration torque of a hybrid vehicle according to an exemplary embodiment of the present invention.

As shown in FIG. 2, a method for controlling acceleration torque of a hybrid vehicle according to an exemplary embodiment of the present invention begins at a starting state of the vehicle at a step S210. If the vehicle is started, the control portion 50 sets the creep torque stored therein as the minimum torque at a step S220. The creep torque is a torque necessary for driving the vehicle at a D range without a driver's pushing the accelerator pedal (i.e., the position of the accelerator pedal is 0%).

At this state, the SOC detector 30 detects the SOC of the battery and the environmental variable detector 40 detects the engine environmental variables and the motor environmental variables. The signal corresponding to the SOC of the battery and the signals corresponding to the engine environmental variables and the motor environmental variables are delivered to the control portion 50 accordingly.

The control portion 50 calculates the maximum torque that can be output from the engine 60 considering of the engine environmental variables at a step S230. As described above, the engine environmental variables include the current altitude of the vehicle, the engine friction torque, and the engine oil temperature (the ambient temperature).

At the step S230, a coefficient according to the altitude of the vehicle, a coefficient according to the engine friction torque, and a coefficient according to the engine oil temperature are calculated, and the maximum torque that can be output from the engine 60 considering of the engine environmental variables is calculated by multiplying the coefficients by the maximum torque that can be output from the engine 60 at a normal state.

In addition, the control portion 50 calculates the maximum torque that can be output from the motor 70 considering of the motor environmental variables at a step S240. As described above, the motor environmental variables include the temperature of the motor 70 and the SOC of the battery.

At the step S240, a coefficient according to the motor temperature and a coefficient according to the battery SOC are calculated, and the maximum torque that can be output from the motor 70 considering of the motor environmental variables is calculated by multiplying the coefficients by the maximum torque that can be output from the motor 70 at a normal state.

After that, the control portion 50 calculates the maximum torque of the vehicle by adding up the maximum torque that can be output from the engine 60 and the maximum torque that can be output from the motor 70 at a step S250.

Subsequently, the accelerator pedal position detector 10 detects the position of the accelerator pedal which the driver pushes at a step S260. Then, the control portion 50 calculates the acceleration torque by using the position of the accelerator pedal, the minimum torque, and the maximum torque of the vehicle at a step S270.

Calculation of the acceleration torque according to an exemplary embodiment of the present invention will be described in detail with reference to FIG. 3.

Figure 3:
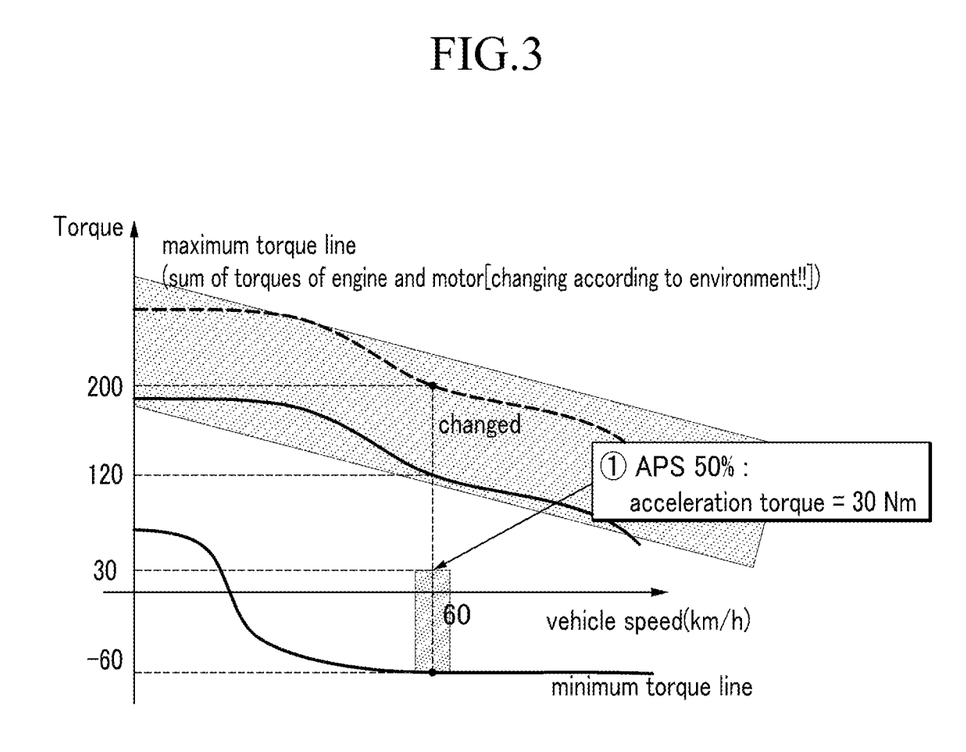
FIG. 3 is a graph illustrating a method for calculating an acceleration torque according to an exemplary embodiment of the present invention.

FIG. 3 is a graph for illustrating a method for calculating an acceleration torque according to an exemplary embodiment of the present invention.

In FIG. 3, an uppermost dotted line represents a maximum torque line of the vehicle calculated according to a conventional method. According to an exemplary embodiment of the present invention, the maximum torque of the vehicle is reduced by the environmental variables and is represented by an upper solid line. Meanwhile, the creep torque is set as the minimum torque in the conventional method and in the exemplary embodiment of the present invention. The minimum torque is represented by a lower solid line.

As described above, when the vehicle speed is 60 km/h, the acceleration torque according to the conventional method is 70 Nm. According to the exemplary embodiment of the present invention, the minimum torque is −60 Nm, the same as the minimum torque according to the conventional method, but the maximum torque is 120 Nm by the environmental variables. That is, the maximum torque of the vehicle is reduced by the environmental variables. Therefore, the acceleration torque of the vehicle according to an exemplary embodiment of the present invention will be calculated as follow. Herein, let's assume that the position of the accelerator pedal is 50%.

$$\text{acceleration torque} = (\text{maximum torque} + \text{minimum torque}) * \text{position of accelerator pedal}$$
$$= (120 - 60) * 0.5 = 30 \text{ Nm}$$

Thus, according to the exemplary embodiment of the present invention, the acceleration torque of the vehicle is calculated to be 30 Nm under the same condition of the conventional method. Therefore, the acceleration torque is reduced in the present invention based on the environmental variables.

According to the conventional method, since the maximum torque of the vehicle does not change, the calculated acceleration torque of the vehicle remains very high. Therefore, the torque divided to the motor 70 is also high and therefore it is very difficult to maintain the SOC of the battery optimally.

Advantageously, since the maximum torque of the vehicle changes according to the environmental variables, the torque divided to the motor 70 is determined optimally. Therefore, the SOC of the battery can be managed optimally.

If the acceleration torque of the vehicle is calculated, the control portion 50 divides the acceleration torque to the engine 60 and the motor 70. If the maximum torque that can be output from the engine 60 is $T_{m,eng}$ and the maximum torque that can be output from the motor 70 is $T_{m,mot}$, the torque $T_{eng}$ (divided to the engine 60) and the torque $T_{mot}$ (divided to the motor 70) are calculated by following equations.

$$T_{eng}=T*T_{m,eng}/(T_{m,eng}+T_{m,mot})$$

$$T_{mot}=T*T_{m,mot}/(T_{m,eng}+T_{m,mot})$$

Herein, T indicates the acceleration torque of the vehicle.

If the torques divided to the engine 60 and the motor 70 are calculated, the control portion 50 controls the engine 60 and the motor 70 based thereon. As described above, SOC of a battery may be efficiently managed by considering of effects of engine environmental variables and motor environmental variables when an acceleration torque of a vehicle is calculated according to the exemplary embodiment of the present invention. In addition, since the acceleration torque is precisely calculated, fuel economy may be improved.

Furthermore, the control mechanisms of the present invention may be embodied as computer readable media on a computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling acceleration torque to manage a state of charge (SOC) of a battery of a hybrid vehicle, comprising:
   setting, by a control portion, a creep torque as a minimum torque;
   calculating, by the control portion, maximum torque that can be output from an engine based engine environmental variables wherein the engine environmental variables are detected by a detector, wherein the engine environment variables include an altitude of the vehicle, engine friction torque, and an engine oil temperature;
   calculating, by the control portion, maximum torque that can be output from a motor based on motor environmental variables wherein the motor environmental variables are detected by the detector, wherein the motor environmental variables include motor temperature and the SOC of the battery;
   calculating, by the control portion, maximum torque of the vehicle by combining the maximum torque that can be output from the engine and the maximum torque that can be output from the motor;
   calculating, by the control portion, acceleration torque by using a position of an accelerator pedal, the minimum torque, and the maximum torque of the vehicle;
   calculating, by the control portion, an engine division torque and a motor division torque which the engine and the motor respectively output, using the acceleration torque; and
   controlling, by the control portion, the engine and the motor using the engine division torque and the motor division torque to manage the SOC of the battery at an optimal level.

2. A system for controlling acceleration torque to manage a state of charge (SOC) of a battery of a hybrid vehicle, comprising:
   an accelerator pedal position detector detecting a position of an accelerator pedal;
   a vehicle speed detector detecting vehicle speed;
   an SOC detector detecting SOC of the battery;
   an environmental variable detector detecting engine environmental variables and motor environmental variables; and
   a control portion configured to set a creep torque as a minimum torque, calculate a maximum torque of the hybrid vehicle according to the engine environmental variables and the motor environmental variables, and calculate an acceleration torque by using the position of the accelerator pedal, the minimum torque, and the maximum torque of the vehicle,
   wherein the motor environmental variables include motor temperature and the SOC of the battery,
   wherein the engine environmental variables include an altitude of the vehicle, engine friction torque, and engine oil temperature, and
   wherein the control portion is configured to calculate an engine division torque and a motor division torque which the engine and the motor respectively output, using the acceleration torque and is configured to control the engine and the motor using the engine division torque and the motor division torque to manage the SOC of the battery at an optimal level.

3. The system of claim 2, wherein the control portion calculates a maximum torque that can be output from an engine considering of the engine environmental variables, calculates a maximum torque that can be output from a motor considering of the motor environmental variables, and calculates the maximum torque of the vehicle by adding together the maximum torque that can be output from the engine and the maximum torque that can be output from the motor.

4. The system of claim 2, wherein the control portion divides the calculated acceleration torque to the engine and the motor according to a ratio of the maximum torque that can be output from the engine to the maximum torque that can be output from the motor.

5. A non-transitory computer readable medium containing executable program instructions executed by a processor to control acceleration torque to manage a state of charge (SOC) of a battery of a hybrid vehicle, comprising:
   program instructions that set a creep torque as a minimum torque;
   program instructions that calculate a maximum torque that can be output from an engine based engine environmental variables wherein the engine environmental variables are detected by a detector, wherein the engine environment variables include an altitude of the vehicle, engine friction torque, and engine oil temperature;
   program instructions that calculate a maximum torque that can be output from a motor based on motor environmental variables wherein the motor environmental variables are detected by the detector, wherein the motor environmental variables include motor temperature and the SOC of the battery;
   program instructions that calculate a maximum torque of the vehicle by combining the maximum torque that can be output from the engine and the maximum torque that can be output from the motor;
   program instructions that calculate an acceleration torque by using a position of an accelerator pedal, the minimum torque, and the maximum torque of the vehicle;

program instructions that calculate an engine division torque and a motor division torque which the engine and the motor respectively output, using the acceleration torque; and program instructions that control the engine and the motor using the engine division torque and the motor division torque to manage the SOC of the battery at an optimal level.

\* \* \* \* \*